(12) United States Patent
Mitchell et al.

(10) Patent No.: US 8,925,344 B2
(45) Date of Patent: Jan. 6, 2015

(54) FITTING ASSEMBLIES TO PROVIDE FLUID SUPPLY TO ICE AND WATER DISPENSERS IN REFRIGERATOR DOORS

(75) Inventors: Alan Joseph Mitchell, Louisville, KY (US); Christopher David Hunter, Louisville, KY (US)

(73) Assignee: General Electric Company, Schenectady, NY (US)

( * ) Notice: Subject to any disclaimer, the term of this patent is extended or adjusted under 35 U.S.C. 154(b) by 1016 days.

(21) Appl. No.: 12/877,675

(22) Filed: Sep. 8, 2010

(65) Prior Publication Data
US 2012/0055190 A1   Mar. 8, 2012

(51) Int. Cl.
*F25D 3/00* (2006.01)
*F25D 23/12* (2006.01)
*F16L 37/56* (2006.01)

(52) U.S. Cl.
CPC ............... *F25D 23/126* (2013.01); *F16L 37/56* (2013.01)
USPC ............................................ 62/389; 285/243

(58) Field of Classification Search
USPC ..................... 285/322, 243; 62/389
See application file for complete search history.

(56) References Cited

U.S. PATENT DOCUMENTS

| 4,588,214 | A | 5/1986 | Guest |
| 6,751,978 | B1 | 6/2004 | Gagne et al. |
| 7,758,085 | B2 | 7/2010 | Guest |
| 2009/0077995 | A1* | 3/2009 | Ihle et al. ........................ 62/389 |
| 2009/0140514 | A1 | 6/2009 | Guest |

* cited by examiner

*Primary Examiner* — Aaron Dunwoody
(74) *Attorney, Agent, or Firm* — Global Patent Operation; Douglas D. Zhang

(57) ABSTRACT

A fitting assembly is provided that includes a bracket comprising at least one fitting having a first opening and a second opening, in which the second opening includes at least one ledge on an inner sidewall of the fitting and the first opening is interconnected with a first tube, in which the bracket, the fittings and the first tube are a unitary structure. A seal assembly is present in the second opening of the at least one fitting of the bracket, and a second tube in engaged to the seal assembly. The seal assembly includes a frictional bore surface and at least one gasket, which are in contact with the second tube.

16 Claims, 6 Drawing Sheets

FITTING ASSEMBLIES TO PROVIDE FLUID SUPPLY TO ICE AND WATER DISPENSERS IN REFRIGERATOR DOORS

BACKGROUND OF THE INVENTION

The present invention relates generally to tube fittings and/or junctions, such as tube fittings suitable for transporting fluids in making ice and delivering water throughout a refrigerator.

It is common practice in the art for refrigerators to provide an automatic icemaker, as well as water dispensers to provide the convenience of chilled water to the consumer. To further consumer convenience, ice makers and ice and water dispensers have been integrated into the freezer or fresh food door of the refrigerator. Typically, to integrate the ice maker and the ice and water dispensers into the freezer or fresh food door of the refrigerator, fluid lines for each application are run through the freezer or fresh food door to supply water to the ice maker and water dispenser.

BRIEF DESCRIPTION OF THE INVENTION

A fitting assembly is provided that in some embodiments is suitable for providing interconnection of fluid delivery tubes to the various compartments of a refrigerator, such as the freezer or fresh food door. In one embodiment, the fitting assembly includes a bracket with at least one fitting including a first opening and a second opening, in which the first and second openings are present on opposing sides of the bracket and are interconnected. The second opening of the fitting includes at least one ledge on its inner sidewall, and the first opening of the fitting is interconnected with a first tube. In one embodiment, the bracket, the at least one fitting, and the first tube are integrated into a unitary structure.

The fitting assembly further includes a seal assembly that is present in the second opening of the at least one fitting. In one embodiment, the seal assembly includes at least one gasket and at least one body, wherein at least one of the gaskets is seated on the ledge of the second opening in the fitting. The at least one body of the seal assembly includes a first face that is adjacent to the ledge of the at least one fitting on which the gasket is seated, an outer frictional surface that is in contact with the inner sidewall of the second opening of the at least one fitting, and a bore that is present through the at least one body with a frictional bore surface. A second tube is engaged to the second opening of the at least one fitting through the seal assembly, wherein the frictional bore surface of the at least one body and the at least one gasket are in contact with the second tube.

In another aspect, a refrigerator is provided having at least one of an ice maker and water dispenser that are present in at least one door of the refrigerator. In one embodiment, the refrigerator includes a cabinet having at least one storage compartment, and a door comprising at least one of an ice maker and a water dispenser, in which at least one fitting assembly is present through a sidewall of at least one of the cabinet and the door for connectivity to a fluid supply to at least one of the ice maker and the water dispenser. The fitting assembly includes a bracket having at least one fitting with interconnected first and second openings that are present on opposing sides of the bracket. In one embodiment, the first opening of the fitting is interconnected with a first tube as a unitary structure, in which the first tube extends into an interior of one of the cabinet and the door of the refrigerator to which the bracket is mounted. The second opening of the fitting may be engaged to a second tube that is present at the exterior of at least one of the cabinet and the door through a seal assembly.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and that, unless otherwise indicated, they are merely intended to conceptually illustrate the structures and procedures described herein.

DETAILED DESCRIPTION OF THE EXEMPLARY EMBODIMENTS OF THE INVENTION

Figure 1:
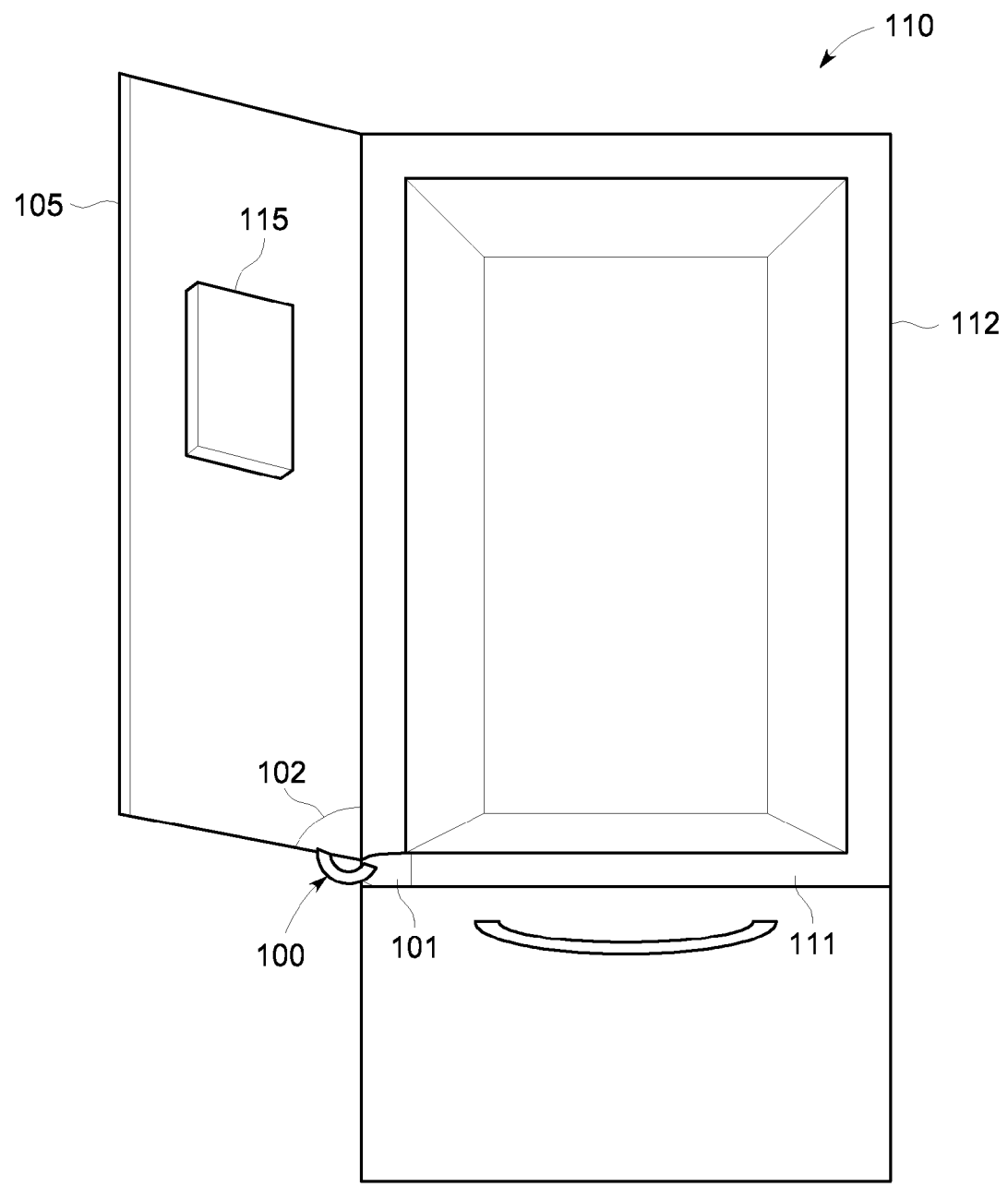
FIG. 1 is a highly schematic perspective view of one embodiment of a refrigerator having a water and/or ice dispenser present in the door of the refrigerator, in which the water supply to the water and/or ice dispenser includes a first fitting assembly present through the mullion of the refrigerator cabinet, and a second fitting assembly integrated with the refrigerator door.

Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper", "lower", "right", "left", "vertical", "horizontal", "top", "bottom", and derivatives thereof shall relate to the invention, as it is oriented in the drawing figures.

The embodiments of the present invention relate to fitting assemblies that provide junctions in fluid supplies. More specifically, in one application, the fitting assemblies 100 may be incorporated into the fluid supply of refrigerator 110 to the drinking water and/or ice dispenser units 115 that are present in the refrigerator door 105 of the refrigerator 110, as depicted in FIG. 1. On the exterior face of the refrigerator door 105 there is an external access area (not shown) to drinking water and ice. Upon a stimulus, the drinking water dispenser allows an outflow of drinking water into a user's receptacle. Upon another stimulus, an ice dispenser allows an outflow of ice into a user's receptacle.

Typically, to integrate icemakers and dispensing units for ice and drinking water into the refrigerator door, two water lines are drawn through the refrigerator door hinge, one for the ice maker and one for the water dispenser. In prior designs, the water lines exit a mullion surface of the refrigerator cabinet and travel at an angle of less than 90 degrees then turn upwards at approximately 90 degrees entering into the refrigerator door. It has been determined that a stress point can develop at the point at which the water lines exit the cabinet, which can result in kinking of the water lines and/or cracking and leaking of the water lines.

It has been determined that the failure of the water lines (hereafter referred to as tubes) may be decreased by mounting a fitting assembly 100 on at least one of the refrigerator cabinet 112 and the refrigerator door 105 to provide for the transport of the fluid supply between the refrigerator cabinet 112 and the refrigerator door 105, as depicted in FIG. 1. In one embodiment, a first fitting assembly 101 may be present on the mullion surface 111 of the refrigerator cabinet 112, and a second fitting assembly 102 may be present providing a passageway to the interior of the refrigerator door 105. In some examples, the second fitting assembly 102 may be integrated into the hinge of the refrigerator door 105 through a hinge plate.

Figure 2:
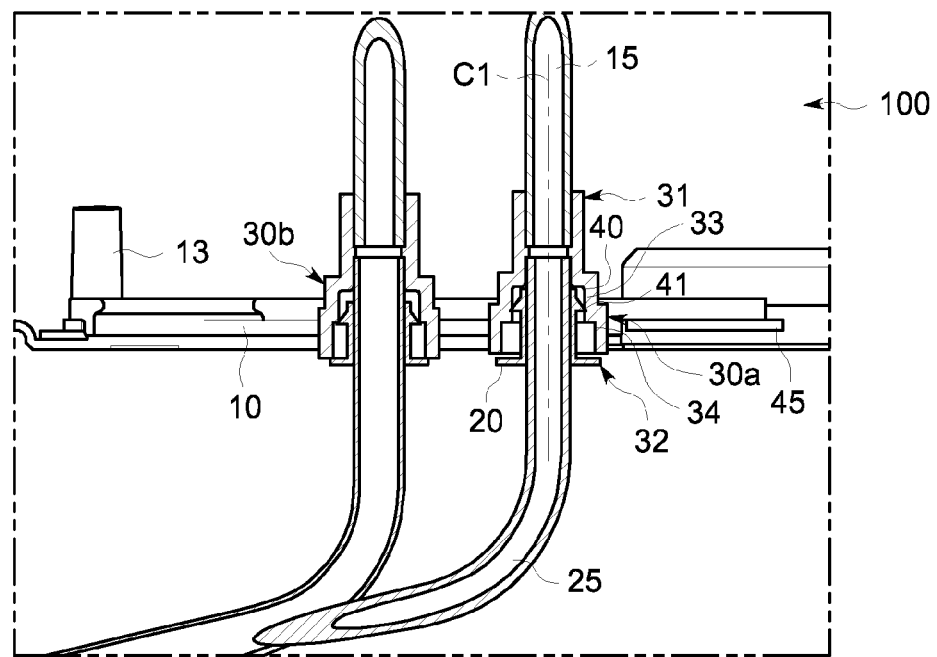
FIG. 2 is a side cross-sectional view of one embodiment of a fitting assembly, in accordance with the present invention.

FIG. 2 depicts the components of one embodiment of a fitting assembly 100 that may be mounted to either the refrigerator door or the refrigerator cabinet. In the embodiment that is depicted in FIG. 2, the fitting assembly 100 includes a bracket 10 having two tube fittings, i.e., a first fitting 30a and a second fitting 30b. Each of the first fitting 30a and the second fitting 30b provides an essentially identical junction with tubes that are suitable for transporting fluids in making ice and delivering water throughout a refrigerator. For example, the first fitting 30a may be incorporated with the fluid supply to the ice maker, and the second fitting 30b may be incorporated with the fluid supply to the water dispenser. Although the following description is directed to the connectivity at the first fitting 30a of the bracket 10, it is equally applicable to the connectivity at the second fitting 30b of the bracket 10, because the tube junction at the first fitting 30a is essentially identical to the tube junction at the second fitting 30b.

The first fitting 30a of the bracket 10 includes a first opening 31 for sealingly receiving a first tube 15, and a second opening 32 for sealingly receiving a second tube 25. A seal assembly 20 provides the engagement of the second tube 25 to the second opening 32. The seal assembly includes a gasket 40 and a body 41 that is reversibly engaged within the second opening 32 of the first fitting 30a.

The first opening 31 and the second opening 32 of the first fitting 30a are present on opposing sides of the bracket 10 and are interconnected to provide a passageway through the bracket 10. The first opening 31 and the second opening 32 of the first fitting 30a preferably have a circular cross-section across a centerline C1 extending from the first opening 31 to the second opening 32, as depicted in FIG. 2.

Figure 3:
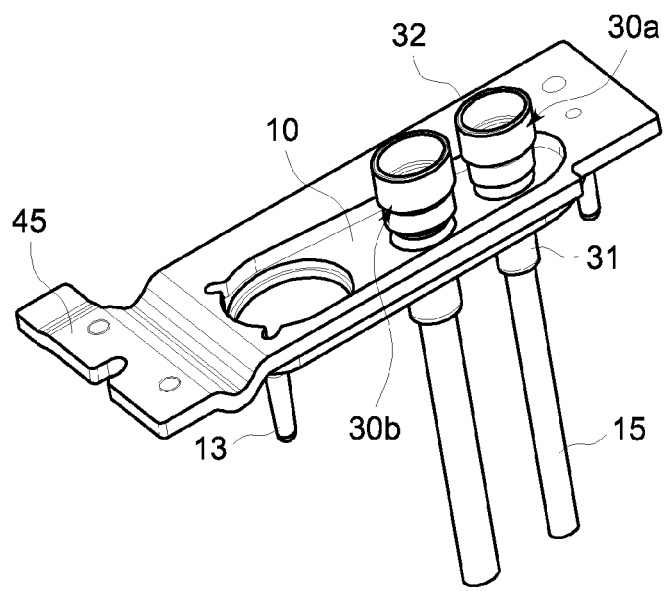
FIG. 3 is a perspective view of a bracket of a fitting assembly, in accordance with one embodiment of the present invention.

Referring to FIGS. 2 and 3, the bracket 10 and the first fitting 30a are incorporated into a unitary structure. The term "unitary structure" as used to define the structural relationship between the first fitting 30a and the bracket 10 means that the first fitting 30a and the bracket 10 are integrated into a single undivided structure, which is differentiated from an assembly of more than one structure. Forming the first fitting 30a and the bracket 10 in a unitary structure eliminates the likelihood of leakage between the first fitting 30a, and the bracket 10 by eliminating the presence of joints between the two elements.

The unitary structure that includes the bracket 10 and the first fitting 30a is typically composed of a polymeric material, such as a thermosetting polymer. In one example, the unitary structure that includes the bracket 10 and the first fitting 30a is composed of a polymer including, but not limited to Polyethylene, Cross Linked Polyethylene and Polypropylene to provide a rigid structure.

Bracket 10 is connected to a base plate 45 to facilitate attachment to a surface of the refrigerator cabinet, such as the mullion surface, or to facilitate attachment to a surface of the refrigerator door. Base plate 45 is a hinge plate that includes bosses for mechanical attachment of a hinge. The base plate 45 may be composed of a metal, such as steel, but other rigid materials have been contemplated and are within the scope of the present invention. The bracket 10 may be mechanically or adhesively connected to the base plate 45. In the embodiment of FIGS. 2 and 3, the bracket 10 includes bosses 13 to provide for mechanical engagement of fasteners to connect the bracket 10 to the base plate 45, or to connect the bracket 10 directly to an exterior surface of the refrigerator cabinet or the refrigerator door.

FIGS. 2 and 3 further illustrate where the first opening 31 of the first fitting 30a is engaged to a first tube 15, in which the first tube 15 is to be positioned within the interior of the refrigerator cabinet or within the interior of the refrigerator door. In some embodiments, the first tube 15 is foamed into the interior of the refrigerator cabinet or foamed into the interior of the refrigerator door. Foamed into the interior of the refrigerator cabinet or the interior of the refrigerator door means that the first tube 15 is positioned within the interior of the refrigerator cabinet or refrigerator door, and is then encased with an insulating material, in which the insulating material fills the refrigerator cabinet or refrigerator door.

The first tube 15 may be composed of polymeric tubing. Typically, the polymeric tubing is composed of material suitable for the transport of potable water. In one example, the first tube 15 is composed of a thermosetting polymer, such as cross-linked polyethylene (PEX). It is noted that other suitable materials may be similarly employed for the first tube 15. Typically, the first tube 15 is flexible.

Figure 4:
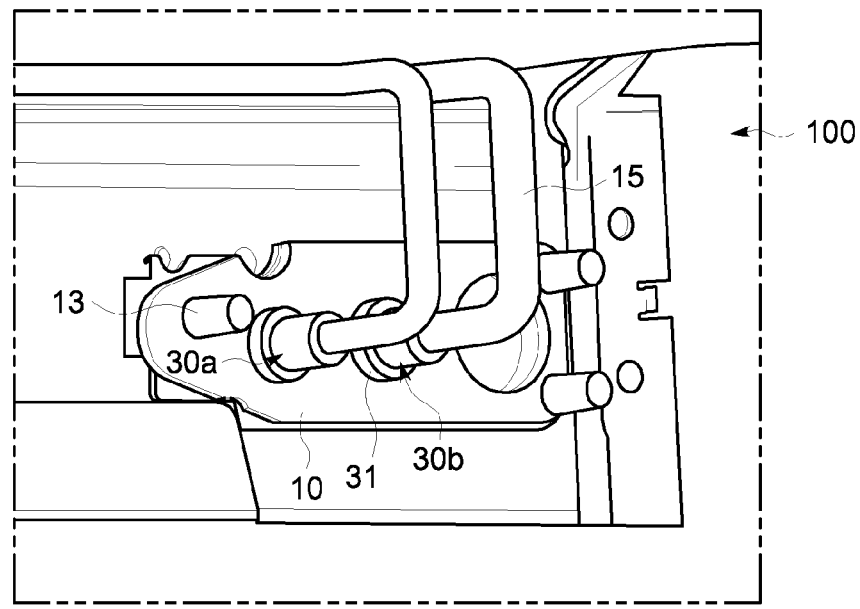
FIG. 4 is a perspective view of the interior face of the bracket of FIG. 3 viewed from the interior of a refrigerator cabinet or refrigerator door.
Figure 5:
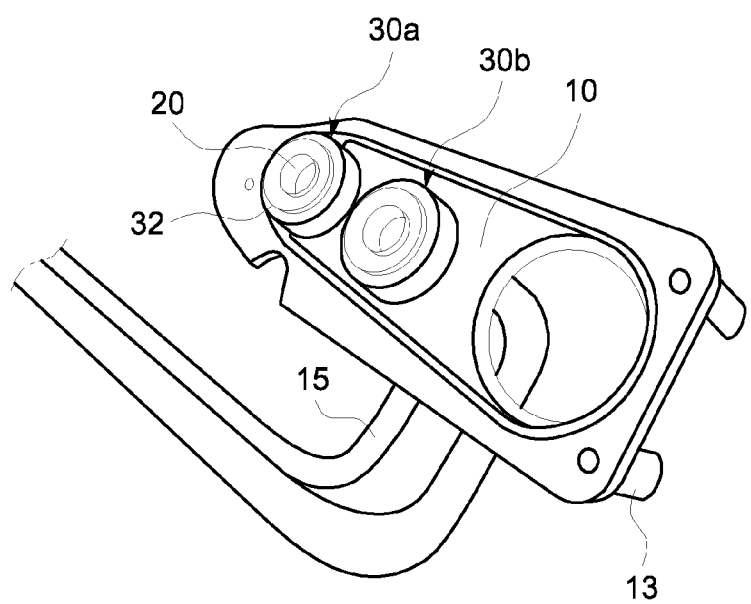
FIG. 5 is a perspective view of one embodiment of a seal assembly engaged to the second opening of the at least one fitting of the bracket.

FIG. 4 depicts a perspective view of the bracket 10 mounted to either the refrigerator door or the refrigerator cabinet from the interior of the structure to which the bracket 10 is mounted. FIG. 4 illustrates that the first opening 31 of the first fitting 30a, and the first tube 15 are positioned within the interior of the refrigerator cabinet or the refrigerator door.

In the embodiment illustrated in FIG. 4, the first tube 15 is engaged to the first opening 31 of the first fitting 30a by an over-molding process in which melted resin flows over an already molded part. More specifically, in the illustrative embodiment, an end portion of the first tube 15 is positioned within the mold that dictates the geometry of the bracket 10 and the first fitting 30a. As the material that forms the bracket 10 and the first fitting 30a is introduced to the mold, e.g., injected into the mold, the first opening 31 of the first fitting 30a is formed onto at least one sidewall of the first tube 15. Typically, the first tube 15 and the bracket 10 are made of similar materials so that they alloy or mix together during over-molding. By joining the first fitting 30a to the first tube 15 using an over-molding process, a unitary structure is provided between the first tube 15 and the first fitting 30a. The term "unitary structure" as used to describe the structural relationship between the first tube 15 and the first fitting 30a means that the first tube 15 and the first opening 31 are integrated in a single undivided structure. The joining of the first fitting 30a and the first tube 15 results in a sealed engagement at the entire interface between the structures that eliminates the likelihood of leakage between the first fitting 30a and the first tube 15.

Therefore, in one embodiment, the present invention eliminates the possibility of leakage within the interior of the cabinet walls and the interior of the refrigerator door from the water supply to the drinking water and ice dispensers. In one embodiment, the first tube 15 is flexible while the bracket 10 and the first fitting 30a are rigid.

In one embodiment, the bracket 10, the first fitting 30a, and the first tube 15 are a unitary structure composed of the same composition material. In another embodiment, the bracket 10 and the first fitting 30a are composed of a first material, and the first tube 15 is composed of a second material, in which the first material has a different composition than the second material. In the embodiments in which the first tube 15 is composed of a different material than the bracket 10 and the first fitting 30a, the sealed interface between the first tube 15 and the first opening 31 of the first fitting 30a may be an alloyed region composed of the material of the first tube 15 and the first fitting 30a. The alloyed region results from the over-mold process. In one embodiment, the alloyed region is entirely composed of the material of the first fitting 30a and the first tube 15, in which the alloyed region is devoid of a third material.

Referring to FIGS. 2 and 3, the second opening 32 of the first fitting 30a includes an inner sidewall having a first ledge or shoulder 33 to seat a gasket 40, and a second ledge or shoulder 34 to locate the body 41 of the sealing assembly 20.

Figure 6:
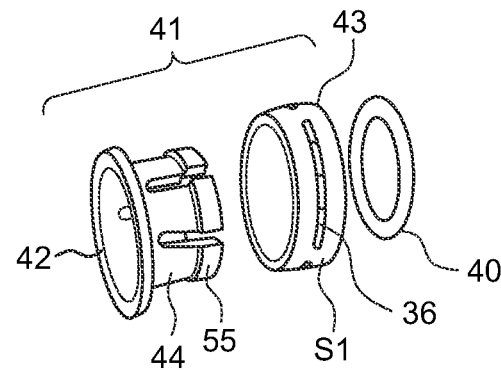
FIG. 6 is an exploded perspective view of one embodiment of a seal assembly including at least one gasket and a body, in which the seal assembly is configured for engagement into the second opening of the at least one fitting in the bracket of the fitting assembly, in accordance with the present invention.

FIG. 6 depicts an exploded view of a seal assembly 20 that includes a gasket 40 and a body 41, in which the body 41 includes a collet 42 and a retaining ring 43. The gasket 40 may be provided by an o-ring constructed of polymeric material including, but not limited to, polyurethane, silicone, neoprene, nitrile rubber, fluorocarbon, or EPDM. Although the cross-section of the o-ring illustrated is circular, other geometries have been contemplated and are within the scope of the present invention.

Figure 7:
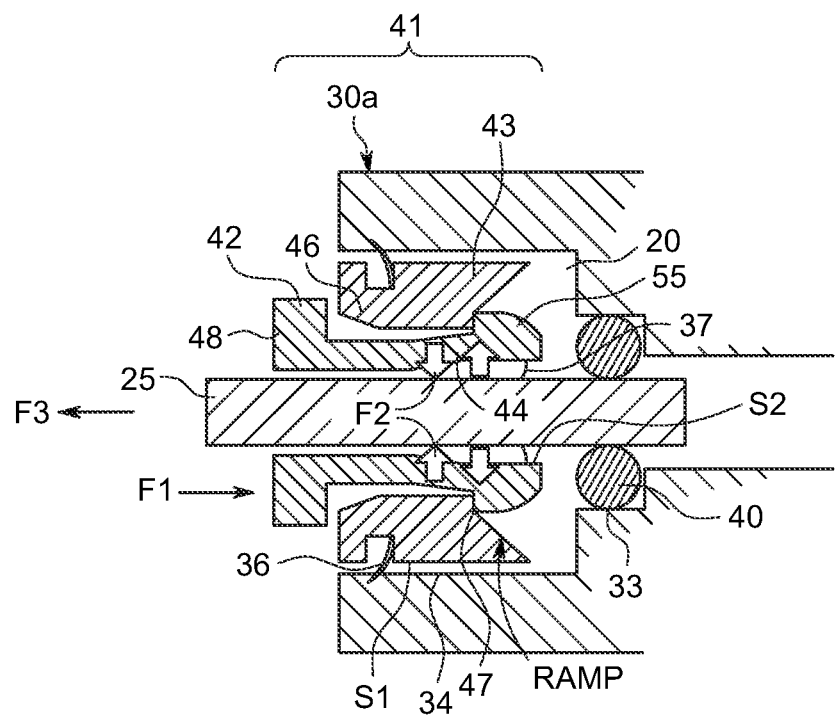
FIG. 7 is a side cross-sectional view of one embodiment of a seal assembly engaged to the second opening of the fitting to the bracket, in accordance with the present invention.

The collet 42 includes a plurality of resilient beams 44, which each include a locking tab 55. "Resilient" denotes a property of a material that allows it return to its original shape after being deformed. The collet 42 may be composed of a copolymer, such as acetal copolymer. Collet 42 provides a bore through the body 41 of the sealing assembly 40 having a frictional bore surface S2, as depicted in FIG. 7. The term "frictional" as used to describe a surface means that the surface when in contact with another surface produces a force that resists the relative lateral (tangential) motion of the solid surfaces that are in contact. In one example, the frictional bore surface S2 of the collet 42 is provided by teeth 37 extending inwardly from the inner surface of the resilient beams 44 that are opposite the locking tab 55. The teeth 37 may be composed of a metal, such as stainless steel, but other rigid materials have been contemplated for the teeth 37 of the frictional bore surface S2, and are within the scope of the present disclosure. For example, the frictional bore surface S2 may be provided by surface irregularities or teeth 37 that are formed on the interior sidewall of the collet 42, wherein the surface irregularities or teeth 37 may be composed of the same material as the collet 42.

Referring to FIGS. 6 and 7, the retaining ring 43 defines a central opening for receiving the collet 42. The retaining ring 43 includes at least one ramp 46 along at least a portion its interior walls for reducing the diameter of the bore therethrough. The retaining ring 43 further includes a relief 47 positioned following the peak of the ramp 46. The exterior surface of the retaining ring 43 provides the outer frictional surface S1 of the body 41 that engages the interior sidewall of the first fitting 30a, when the seal assembly 20 is engaged to the first fitting 30a. In one embodiment, the outer frictional surface S1 of the retaining ring 43 comprises teeth 36. The teeth 36 may be composed of a metal, such as stainless steel, but other rigid materials have been contemplated for the teeth 36 of the outer frictional surface S1, and are within the scope of the present disclosure. The body of the retaining ring 43 may be composed of a copolymer, such as acetyl copolymer. In another embodiment, the retaining ring 43 may be welded into the first fitting 30. The welding method for engaging the retaining ring 43 to the first fitting 30 may include spin or vibration welding methods.

Referring to FIG. 7, when the seal assembly 20 is engaged to the first fitting 30a by insertion in the second opening 32, the body 41 of the seal assembly 20 is positioned within the first fitting 30a so that the ends of the resilient beams 44 that are proximate to the locking tabs 55 obstruct the gasket 40 from being unseated from the shoulder 33.

Still referring to FIG. 7, when the retaining ring 43 is present in the second opening 32 of the first fitting 30a, and the collet 42 is being inserted into the retaining ring 43 in the direction of F1, the at least one ramp 46 of the retaining ring 43 momentarily deflects the resilient beams 44 of the collet 42 in a first direction until the locking tab 55 of the resilient beam 44 passes over the peak of the ramp 46. As the locking tab 55 of the resilient beam 44 passes over the peak of the ramp 46, the resilient beams 44 deflects in a second direction that is opposite the first direction until the locking tab 55 engages the relief 47 in locking engagement.

The friction fit between the outer frictional surface S1 of the retaining ring 43 and the second ledge 34 enhanced by the teeth 36 obstructs the relative lateral motion of the retaining ring 43 relative to fitting 30a.

FIGS. 2 and 7 further depict the engagement of the second tube 25 with the frictional bore surface S2 of the collet 42, and where the second tube 25 is in sealing contact with the gasket 40 that is seated on the first ledge 33 of the first fitting 30a.

The second tube 25 typically transports the water supply between the refrigerator cabinet 112 and the refrigerator door 105. The second tube 25 may be composed of polymeric tubing. In one embodiment, the polymeric tubing is composed of material suitable for the transport of potable water. In one example, the second tube 25 is composed of a flexible thermosetting polymer, such as cross-linked polyethylene (PEX) or a thermoplastic polymer, such as polyethylene. It is noted that other materials have been contemplated for the second tube 25, and are within the scope of the present disclosure.

In the embodiments depicted in FIGS. 2 and 7, the second tube 25 is reversibly engaged to the first fitting 30a through the seal assembly 20. In order to remove the second tube 25 from the seal assembly 20, a force is applied to, for example, the base portion 48 of the collet 42 in the direction F3 to move the collet 42 further inside, which causes the resilient beams 44 to deflect so that the locking tab 55 moves radially outward and/or forward. For this purpose, as indicated in FIG. 3, more space is provided between the retaining ring 43 and the second annular ledge 34 so that the locking tab 55 can move radially outward and/or forward. This in turn reduces the pressure of the teeth 37 in the direction F2 on the second tube 25. The second tube 25 is also pushed in the direction F1 to release the teeth 37 from the second tube 25. While still pushing the collet 42 in the direction F1, the second tube 25 is then pulled in the direction opposite F1 and out the first fitting 30a. The collet 42 remains in the first fitting 30a after the second tube 25 is removed. Even without the second tube 25, the locking tab 55 interferes with the relief 47 so that the collet 42 is prevented from coming out.

Figure 8:
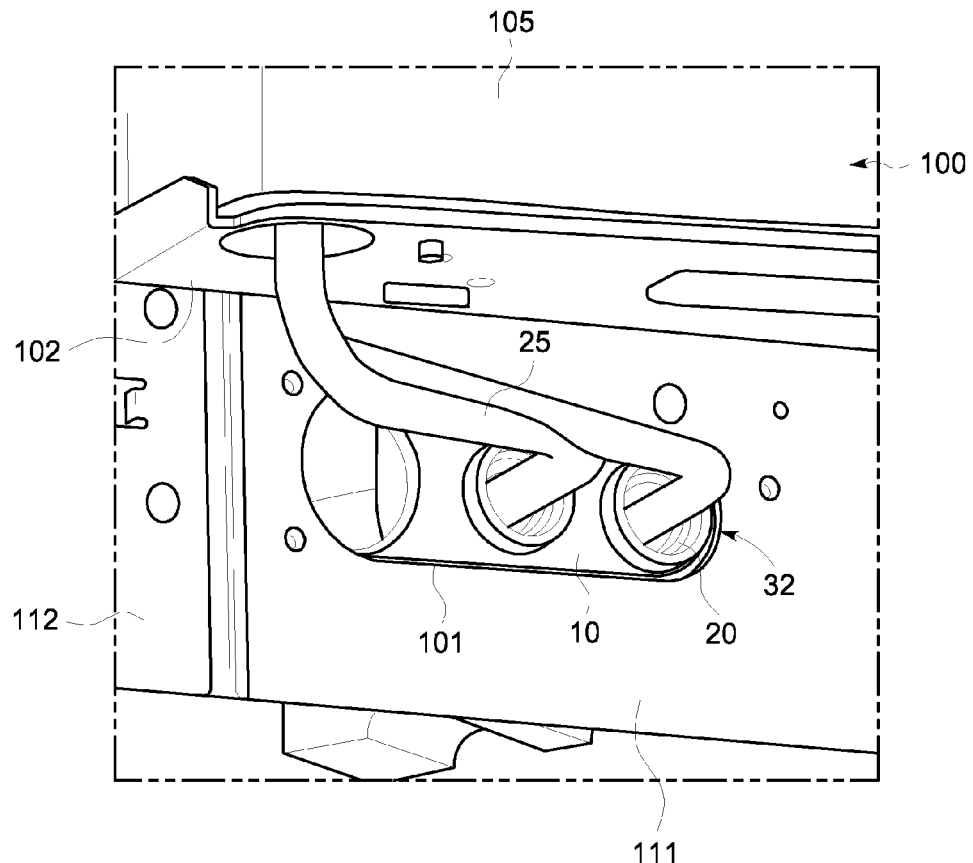
FIG. 8 is a perspective view from the exterior of a refrigerator in which a first fitting assembly is mounted to the refrigerator cabinet and a second fitting assembly is mounted to the refrigerator door, in which second tubes engaged to the first and second fitting assemblies transport fluids between the refrigerator cabinet and the refrigerator door, in accordance with one embodiment of the present invention.

FIG. 8 depicts a second fitting assembly 102 mounted through the exterior surface of the refrigerator door 105, and a first fitting assembly 101 mounted through an exterior surface, e.g., mullion surface 111, of the refrigerator cabinet 112, in which a second tube 25 is engaged to the first fitting assembly 101 and the second fitting assembly 102. The reversible engagement of the second tube 25 that is provided by the seal assembly 20 to the second opening of the first fitting 30a provides that the portion of the water lines that is present outside (to the exterior of) the refrigerator cabinet 112 and the refrigerator door 105, e.g., the second tube 25, may be detachable from at least one of the refrigerator cabinet 112 and the refrigerator door 105.

FIGS. 2, 3, 5 and 8 depict some embodiments of the present invention, in which a centerline C1 extending from the first opening 31 to the second opening 32 of the first fitting 30a is perpendicular to a front face of the bracket 10.

Figure 9:
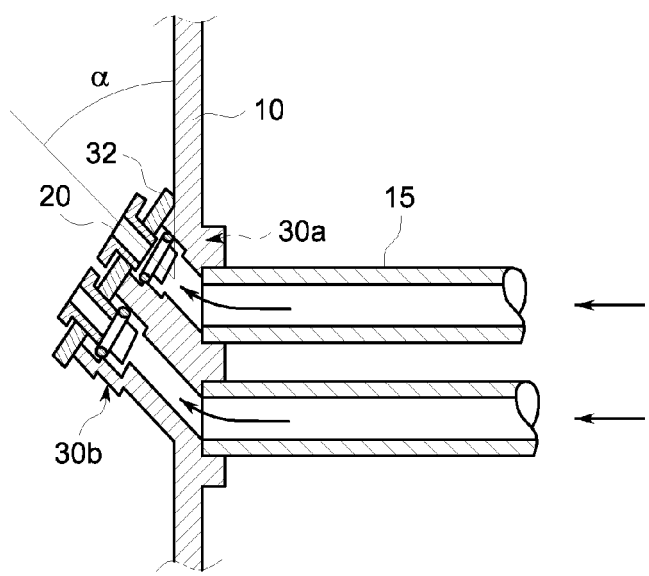
FIG. 9 is a side cross-sectional view depicting one embodiment of a fitting assembly having a canted second opening, in accordance with the present invention.

FIG. 9 depicts another embodiment of the invention, in which the second opening 32 of the first fitting 30a is canted relative to the first opening 31 and the front face of the bracket 10. It has been determined that by providing a second opening 32 that is canted relative to the face of the bracket 10, that the stress that is produced at the connection between the second tube 25 and the bracket 10 may be reduced. In one embodiment, the angle α at which the second opening 32 is canted ranges from approximately 15 degrees to approximately 80 degrees. In another embodiment, the angle α at which the second opening 32 is canted ranges from approximately 30 degrees to approximately 60 degrees. In one example, the second opening 32 is canted by an angle α on the order of approximately 45 degrees.

Figure 10:
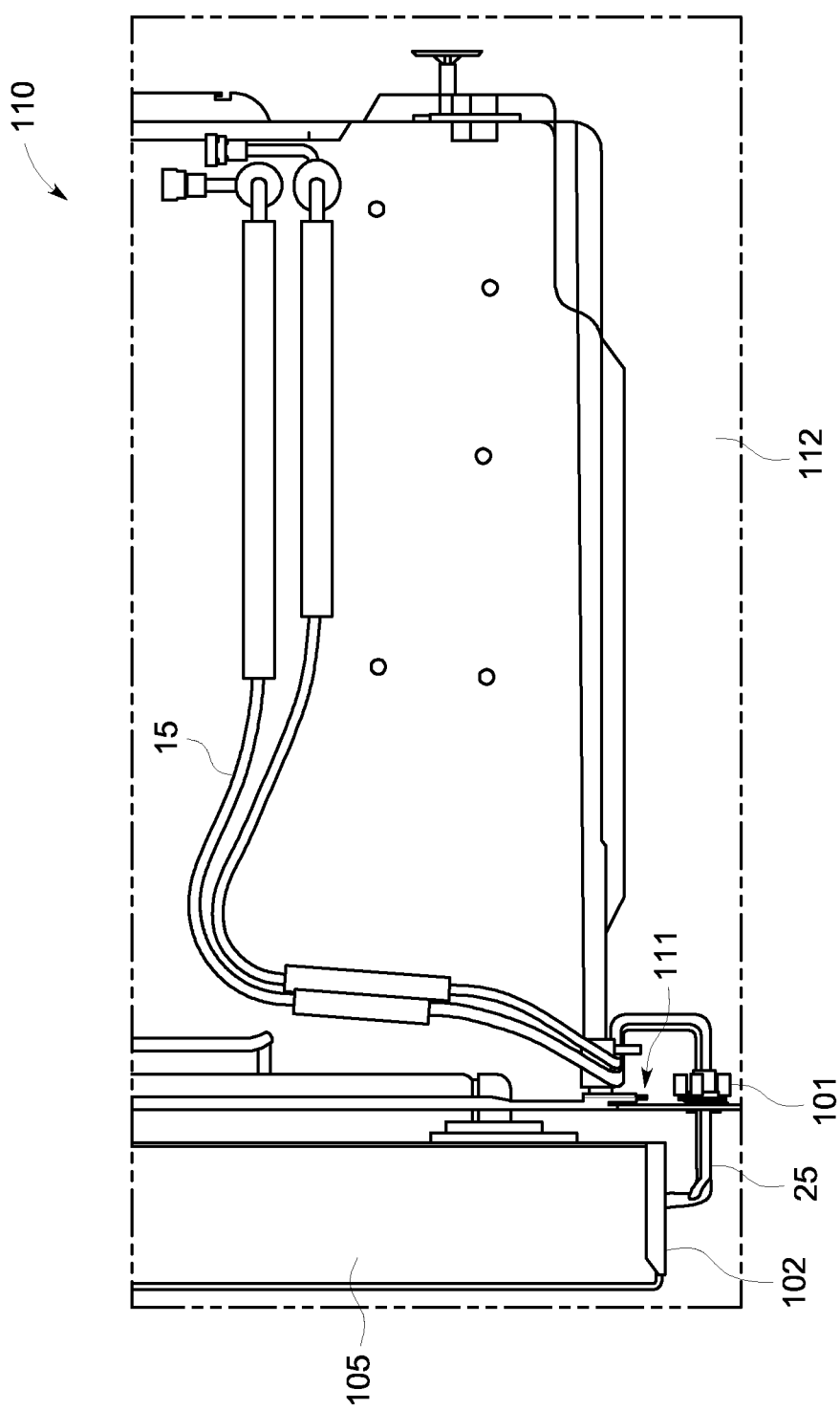
FIG. 10 is a side cross-sectional view of a refrigerator incorporating a fitting assembly in a fluid supply to a water and/or ice dispenser, in accordance with one embodiment of the present invention.

FIG. 10 depicts one embodiment of a refrigerator 110 including at least one of the above-described fitting assemblies. In one embodiment, the refrigerator 110 includes a cabinet 112 defining at least one storing compartment and a refrigerator door 105 including at least one of an ice dispenser and a water dispenser. A first fitting assembly 101 is present through a sidewall of the cabinet 112 and a second fitting assembly 102 is present through the sidewall of the door 105 for connectivity of a fluid supply to each of said at least one of the ice dispenser and the water dispenser. In one embodiment, a first fitting assembly 101 is present on a mullion 111 of the refrigerator cabinet 112 and a second fitting assembly 102 that is present on the refrigerator door 105. The bracket of the second fitting assembly 102 is integrated into a hinge that connects the door 105 to the cabinet 112.

Thus, while there have shown and described and pointed out fundamental novel features of the invention as applied to various specific embodiments thereof, it will be understood that various omissions and substitutions and changes in the form and details of the apparatus illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A refrigerator comprising:
a cabinet defining at least one storing compartment;
a door comprising at least one of an ice dispenser and a water dispenser; and
at least one fitting assembly present through a sidewall of at least one of the cabinet and the door for connectivity of a fluid supply to each of said at least one of the ice dispenser and the water dispenser, the fitting assembly including a bracket having at least one fitting with a first opening and a second opening that are present on opposing sides of the bracket and are interconnected, in which the first opening is interconnected as a unitary structure with a first tube that extends into an interior of the at least one of the cabinet and the door, and the second opening is engaged to a second tube present at the exterior of the at least one of the cabinet and the door by a seal assembly,
wherein the second opening is angled relative to a front face of the bracket and the first opening.

2. The refrigerator of claim 1, wherein the second opening includes at least one ledge on an inner sidewall of the second opening.

3. The refrigerator of claim 2, wherein the seal assembly that is present in the second opening of the at least one fitting comprises a body having a bore present therethrough, and at least one gasket seated on the ledge in the second opening, wherein the body has a first face adjacent to the at least one ledge.

4. The refrigerator of claim 3, wherein the second tube extends through the bore of the body and a portion of a sidewall of the second tube is in contact with the at least one gasket.

5. The refrigerator of claim 4, wherein an exterior surface of the body is frictionally engaged to the inner sidewall of the second opening and a surface of the bore of the body is frictionally engaged to the sidewall of the second tube.

6. The refrigerator of claim 5, wherein the at least one body of the seal assembly further includes a collet and an retaining ring, the collet having a plurality of resilient beams each including a locking tab, the retaining ring including at least one ramp along at least a portion of the inner sidewall of the second opening for reducing a portion of a cavity in at least one dimension and a relief positioned following the at least one ramp, wherein the at least one ramp momentarily deflects at least one of the resilient beams during insertion of the collet into the retaining ring, and the relief provides a locking engagement with the locking tab of the plurality of resilient beams.

7. The refrigerator of claim 6, wherein the collet comprises the bore having the frictional bore surface, wherein the frictional bore surface is provided by teeth in the resilient beams opposite the locking tab, in which insertion of the collet into the retaining ring exerts a force on the resilient beams that engages the second tube.

8. The refrigerator of claim 1, wherein the bracket, the at least one fitting and the first tube are the unitary structure.

9. The refrigerator of claim 1, wherein a centerline extending from the first opening to the bracket is perpendicular to the front face of the bracket.

10. The refrigerator of claim 1, wherein the second opening is angled between 15 and 80 degrees relative to the front face of the bracket.

11. The refrigerator of claim 1, wherein the second opening is angled between 30 and 60 degrees relative to the front face of the bracket.

12. The refrigerator of claim 1, wherein the second opening is angled approximately 45 degrees relative to the front face of the bracket.

13. The refrigerator of claim 1, wherein the fitting assembly further comprises a second fitting having a third opening and a fourth opening that are present on opposing sides of the bracket and are interconnected, in which the third opening is interconnected as a unitary structure with a third tube that extends into the interior of the at least one of the cabinet and the door, and the fourth opening is engaged to a fourth tube present at the exterior of the at least one of the cabinet and the door by the seal assembly.

14. The refrigerator of claim 13, wherein the second tube interconnects with an ice dispenser and the fourth tube interconnects with a water dispenser of the refrigerator.

15. The refrigerator of claim 1, wherein the bracket, the at least one fitting and the first tube are comprised of a thermosetting polymeric material.

16. A refrigerator comprising:
a cabinet defining at least one storing compartment;
a door comprising at least one of an ice dispenser and a water dispenser; and
at least one fitting assembly present through a sidewall of at least one of the cabinet and the door for connectivity of a fluid supply to each of said at least one of the ice dispenser and the water dispenser, the at least one fitting assembly including a bracket having at least one fitting with a first opening and a second opening that are present on opposing sides of the bracket and are interconnected, in which the first opening is interconnected as a unitary structure with a first tube that extends into an interior of the at least one of the cabinet and the door, and the second opening is engaged to a second tube present at the exterior of the at least one of the cabinet and the door by a seal assembly,
wherein the at least one fitting assembly includes a first fitting assembly mounted to a mullion of the cabinet and a second fitting assembly mounted to the door, and
the refrigerator further comprising a hinge that connects the door to the cabinet, the hinge comprising the bracket of the second fitting assembly.

* * * * *